United States Patent [19]

Heymann

[11] Patent Number: 5,014,746

[45] Date of Patent: May 14, 1991

[54] HOLE PATTERN FOR VALVE MUFFLER

[75] Inventor: Frank J. Heymann, Winter Springs, Fla.

[73] Assignee: Westinghouse Electric Corp., Pittsburgh, Pa.

[21] Appl. No.: 465,699

[22] Filed: Jan. 16, 1990

[51] Int. Cl.$^5$ .................. F16K 47/02; F16K 47/14
[52] U.S. Cl. ..................... 137/625.3; 137/625.38; 251/127
[58] Field of Search ............ 137/625.3, 625.38; 251/127

[56] References Cited

U.S. PATENT DOCUMENTS

| 3,602,261 | 8/1971 | Brown | 137/625.3 |
| 3,990,475 | 11/1976 | Myers | 137/625.3 |
| 4,249,574 | 2/1981 | Schnall et al. | 137/625.3 |
| 4,573,492 | 3/1986 | Tadokoro | 137/625.3 X |
| 4,705,071 | 11/1987 | Conners, Jr. et al. | 137/625.3 |
| 4,766,932 | 8/1988 | Heymann et al. | 137/625.3 |

FOREIGN PATENT DOCUMENTS 2443206 3/1976 Fed. Rep. of Germany ...... 251/127

OTHER PUBLICATIONS

Fisher Bulletin: "The Silent Treatment," Sep. 1976, pp. 4–8.

Primary Examiner—Arnold Rosenthal

[57] ABSTRACT

Control valves suitable for use in nuclear power plants are provided which include a muffler having a cylindrical wall with a plurality of substantially circular apertures spaced substantially equilaterally from one another within a portion of the wall. The apertures can be disposed in a repetitive helical pattern of a substantially equilateral triangle for maintaining consistenet ligament widths in all directions for providing uniform structural strength to the valve.

12 Claims, 3 Drawing Sheets

HOLE PATTERN FOR VALVE MUFFLER

FIELD OF THE INVENTION

This invention relates to control valves generally, and more particularly, to improved muffler configurations for controlling valve flow noise in control valves of nuclear power plants.

BACKGROUND OF THE INVENTION

Control valves are utilized in a variety of industrial applications for regulating gases and liquids. One particularly good example is the steam control valve for turbines of a nuclear power plant. Such valves are in fluid communication with steam coming from the steam generator and usually include a cylindrical plug which controls the flow of steam through the turbine. The plug reciprocally slides within a bonnet disposed within the valve body to permit steam flow. Also disposed within the valve body, is usually a noise-suppressing valve cage, or "muffler," having multiple circular apertures, e.g., about 1000 holes 5/16 inches (0.79 cm) I.D., and a series of large window openings. The muffler both guides the valve plug and attenuates valve flow noise. Valve and muffler systems which are relevant in this regard are described in Connors, et al., U.S. Pat. No. 4,705,071, 11/10/87; Brown, et al., U.S. Pat. No. 3,602,261, 8/31/71; and Heymann, et al., U.S. Pat. No. 4,766,932, 8/30/88, which are all hereby incorporated by reference.

Connors, et al. discloses an improved muffler portion design including a plurality of flow pockets, with a flow pocket aligned with the large window openings. This design is stated to reduce vibrations which can damage the valve.

Heymann, et al. discloses an improved steam control valve largely directed to reducing the effect of vibrational excitations experienced during steam throttling. The valve plug of this reference is guided by a substantially rigid cylindrical bushing for reducing vibration.

Brown discloses an early steam control valve which incorporates a valve cage with a muffling device for reducing noise and vibration.

Although control valve structures have been disclosed for reducing the high levels of noise associated with the flow of high-pressure steam in modern steam turbines, there remains a need for a more uniform hole arrangement within the muffler for minimizing deadband and providing a more gradual increase in steam flow as a function of valve lift for minimizing vibration and noise.

SUMMARY OF THE INVENTION

This invention provides an improved muffler apparatus for use in connection with control valves of the type employed in a nuclear power plant. The muffler apparatus includes a cylindrical wall having a plurality of substantially circular apertures disposed therethrough. The substantially circular apertures are spaced nearly equilaterally from one another about a portion of the cylindrical wall to form a substantially helical arrangement or pattern.

Accordingly, the improved muffler apparatus provides more consistent ligament widths between apertures, smoother operation during valve openings, and increased structural strength for resisting mechanical failures.

The apertures of the mufflers of this invention can be disposed in combination with larger window openings which can be disposed around the circumference of the cylindrical wall of the muffler or valve cage. These cylindrical walls can include a sloping surface which is generally parallel to the helix line formation of the circular apertures of the muffler and which delineates the lower portions of the window openings. This feature reduces the upper "deadband" of the steam control valve by providing a continuous increase in steam flow as the valve plug of the preferred embodiment continues upward proximate to the window openings in the valve.

It is therefore an object of this invention to provide hole patterns for use in connection with noise-suppressing mufflers used in control valves which provide a more gradual increase in steam flow as a function of valve lift.

It is another object of this invention to provide more equilateral hole arrangements for control valves and substantially equal ligament widths in all directions for providing uniform structural strength for a given "area ratio."

It is another object of this invention to reduce deadband by minimizing the transition between the helical line of the upper most holes and the window openings of the muffler apparatus.

With these and other objects in view, which will become apparent to one skilled in the art as this description proceeds, this invention resides in the combination, construction, arrangement of parts, and methods substantially as hereinafter described, and more particularly defined in the attached claims.

BRIEF DESCRIPTION OF THE DRAWINGS

The accompanying drawings illustrate prior art muffler designs and preferred embodiments of this invention for illustrating the principles thereof, and in which.

DETAILED DESCRIPTION OF THE INVENTION

This invention provides improved muffler apparatus, preferably for use in connection with valve plugs for controlling steam into a high pressure turbine of a fossil or nuclear power plant. The preferred muffler includes a cylindrical wall having a plurality of substantially circular apertures disposed therethrough. The substantially circular apertures are spaced substantially equilaterally from one another in a portion of cylindrical wall to form a substantially helical pattern. As used herein, the term "circular" refers to apertures having oval, circular, and other smooth arcuate cross sections. The term "substantially equilaterally," refers to the fact that the distance between the centers of the substantially circular apertures is substantially the same, with minor variations due to the effect of the preferred helix angles, manufacturing defects, and other variations which do not substantially inhibit steam flow. The term "muffler" is art-recognized, and is generally interpreted as a noise suppressing valve cage.

Figure 1:
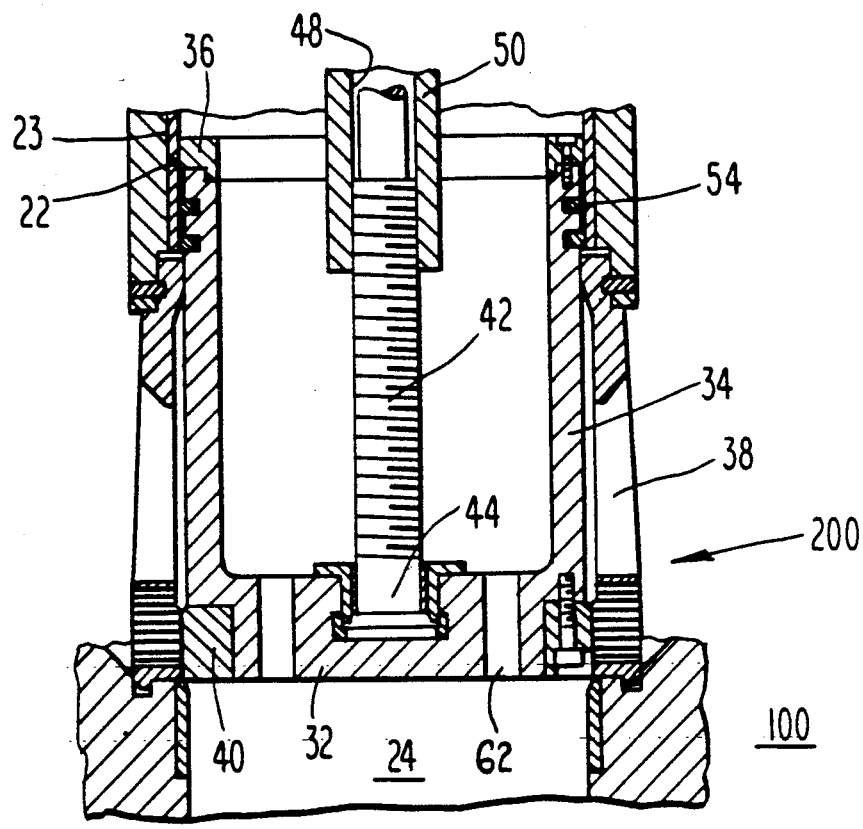
FIG. 1 is a cross-sectional view of a portion of a prior art steam control valve showing bottom muffler portion with the valve plug in the closed position.
Figure 2:
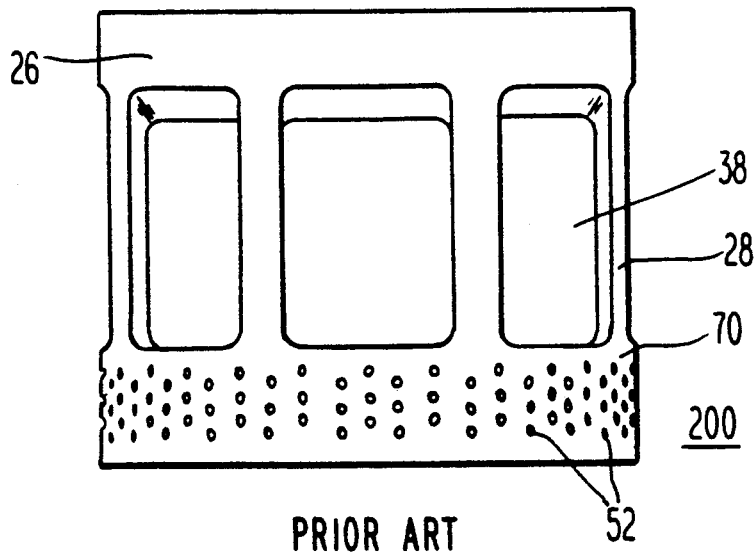
FIG. 2 is a side elevation view of a prior art muffler portion showing the aperture arrangement.

Referring now to FIGS. 1 and 2, there is shown a portion of a prior art steam control valve 100 with its valve cage 200.

Referring first to FIG. 1, there is shown a cross-section of a flow control portion of a prior art steam control valve 100 which incorporates a valve cage 200 with muffling devices 70 and is of the type referenced above and more fully disclosed in U.S. Pat. No. 3,602,261. The valve structure includes a main valve body member (not shown) typically fabricated of a carbon steel casting. The valve 100 includes a valve bonnet (not shown) covering an upper portion of the valve to form a bonnet chamber which is bounded in part by an inner wall 23 or bonnet liner 22. The body member has disposed therein an inlet port (not shown) and an outlet port 24. The body member forms a fluid receiving chamber surrounding the valve cage. The valve cage 200 comprises the lower muffling device 70 including apertures 52, an upper ring 26 and a number of integral struts 28 joining the muffling device 70 to the upper ring 26 and forming openings 38. A valve plug 32 is cup-shaped, having a substantially cylindrical wall 34. An upper guide ring 36 is secured to the plug wall 34 and is in sliding contact with a guiding surface on the inner wall 23 in order to guide movement of the plug 32. The inner wall 23 may be integrally formed with the bonnet. A lower guide ring 40, also secured to plug 32, is in sliding contact with the inner surfaces of the valve cage, i.e., the struts 28 and the muffling device 70, in order to provide guidance for plug movement. A valve stem 42, essentially a cylindrical rod connected at a first end 44 to the plug 32, extends upward from the plug 32 along a central axis to a valve control mechanism (not shown). As is common to valves of this design, stem movement is guided by the sliding contact of the valve stem 42 along various portions of the inner cylindrical surface 48 of an elongated bushing 50. The bushing 50, which extends through the bonnet, and is rigidly connected to the bonnet. The plug 32 includes a plurality of orifices 62 which provide pressure balance between bonnet chamber and the throttled fluid exiting the outlet port 24. Two pressure seal rings 54 prevent the steam from flowing between plug 32 and guiding surface 22 into bonnet chamber and thence into outlet port 24.

Movement of the valve stem 42 by external means, e.g., by a hydraulic actuating system (not illustrated), effects positioning of the valve plug 32 anywhere between closed and open positions. When the valve 100 is operated, the plug 32 is guided by upper and lower guide rings and by the valve stem 42 sliding along the inner cylindrical surface 48. When the valve plug 32 begins to open, steam entering the valve body (not shown) initially flows to the outlet port 24 through the apertures 52 of muffling device 70 in order to minimize noise and vibrations. When the valve plug is above the device 70, steam also flows through the openings 38.

As disclosed in the aforementioned U.S. Pat. No. 3,602,261, the muffling device 70 of FIG. 2 comprises an a plurality of throttling apertures 52, numbering about 1000 or more, for dividing the steam, at small valve openings, into a plurality of discrete flow streams. These passages are not equilaterally spaced, thereby providing areas for stress to concentrate. While the device 70 is useful in reducing some noise and vibration, long term wear life can be effected by stress concentration-induced fractures.

In contrast with this prior art embodiment, the present invention provides substantially circular apertures spaced substantially equilaterally from one another in a portion of the cylindrical wall of the bottom muffler portion of the valve cage. In one embodiment of this invention, the substantially circular apertures are disposed in adjacent loops of a single helix. In such an embodiment, the substantially circular apertures are preferably disposed in a repetitive pattern of a substantially equilateral triangle whose base is equal to about twice the vertical pitch of the helix. In order to achieve the desired substantially equilateral spacing with a single helix, the number of circumferential hole spacings along each loop of the helix should be an odd multiple of 0.5. In addition, the axial pitch of the helix most preferably is chosen to be equal to the circumferential hole spacing divided by 3.46 ($2/\sqrt{3}$).

Figure 3:
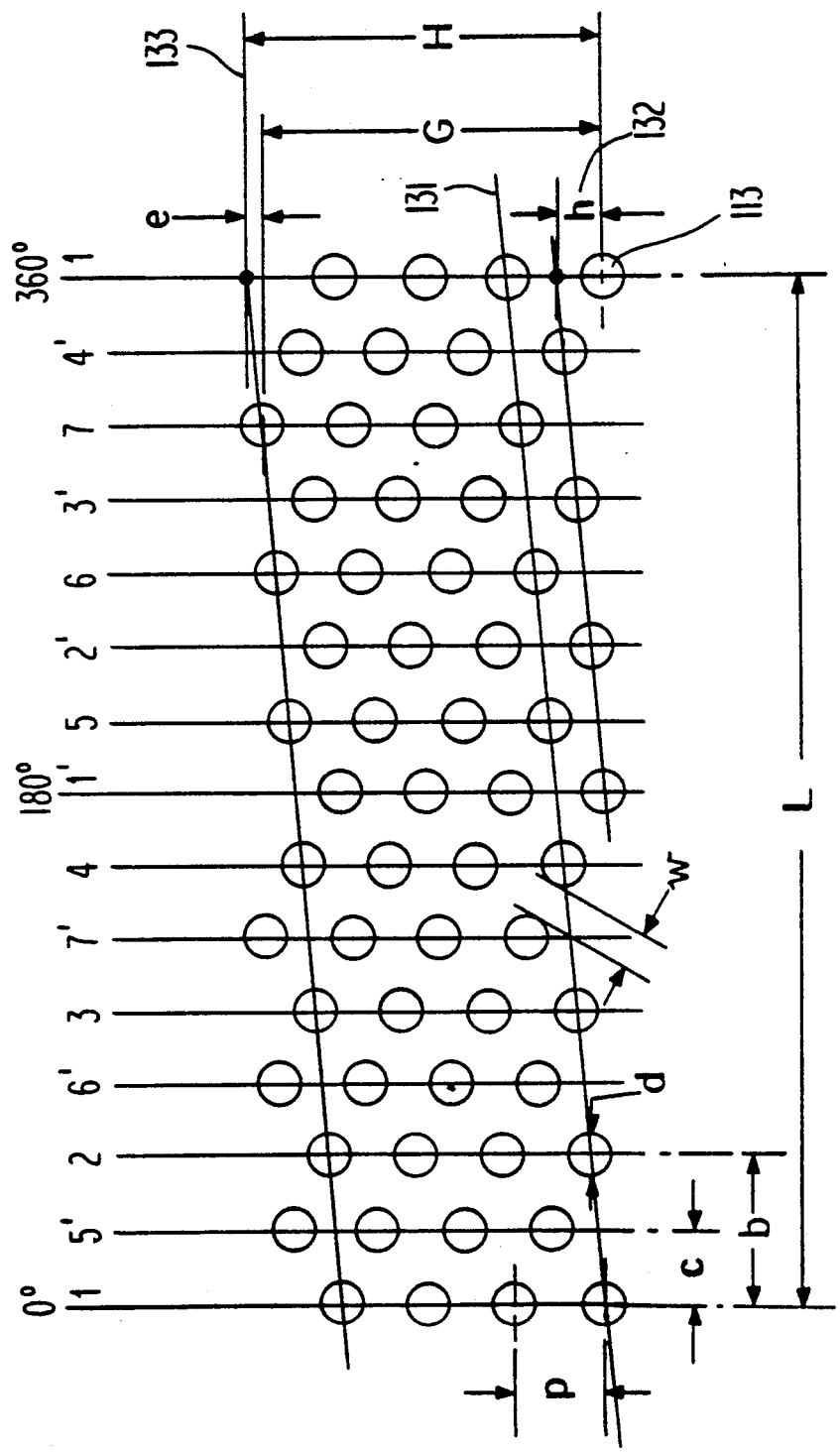
FIG. 3 is a planar diagrammatic view of a double-helical hole arrangement of a preferred muffler design, which has been flattened to more clearly point out spacing; and, FIG. 4 is a partial planar diagrammatic view of a muffler design wherein the large window openings include sloping surfaces which run generally parallel to the helix line formation for minimizing "deadband."

Referring now to FIG. 3, there is shown a developed view of a double-helical hole pattern having circumferential dimensions L, c and b, which pertain to the finished inner diameter of the muffler. For purposes of the diagram, two (intertwined) helices, each composed of about 4 loops and 7 holes per loop are illustrated. The holes on the left of the figure represent 0°, and the holes on the right of the figure represent 360°, and are accordingly the same holes. As described in FIG. 3, the basic hole pattern element is an equilateral triangle whose "base" has vertical distance p, which is also the pitch of each helix loop. The "height" of the triangle is the circumferential distance c. The triangle is skewed, slightly to achieve the overall helical pattern, thus slightly distorting it from a true equilateral shape. The following definitions pertain to the double-helix arrangement:

c = spacing between vertical rows in total pattern.
b = 2c = circumferential spacing between holes in same helix.
L = circumference = nb
n = number of circumferential spaces (i.e., number of holes) per loop in each helix.
n = an odd integer.
p = vertical pitch of each helix = $b/\sqrt{3}$.
h = vertical spacing between adjacent helices = p/2.
m = number of loops in each helix = number of holes in a vertical row.
H = mp = 2mh = total height of pattern.

Additionally, the apertures in the lower loops may be manufactured smaller in diameter than the holes of the upper loops, e.g., about 0.75:1 size ratio, to provide a greater ligament distance between holes when the control valve is operating at higher pressures attendant the lower regions of the muffler. Because of the small vertical offset "e," a smooth rate of opening will still be attained.

Figure 4:
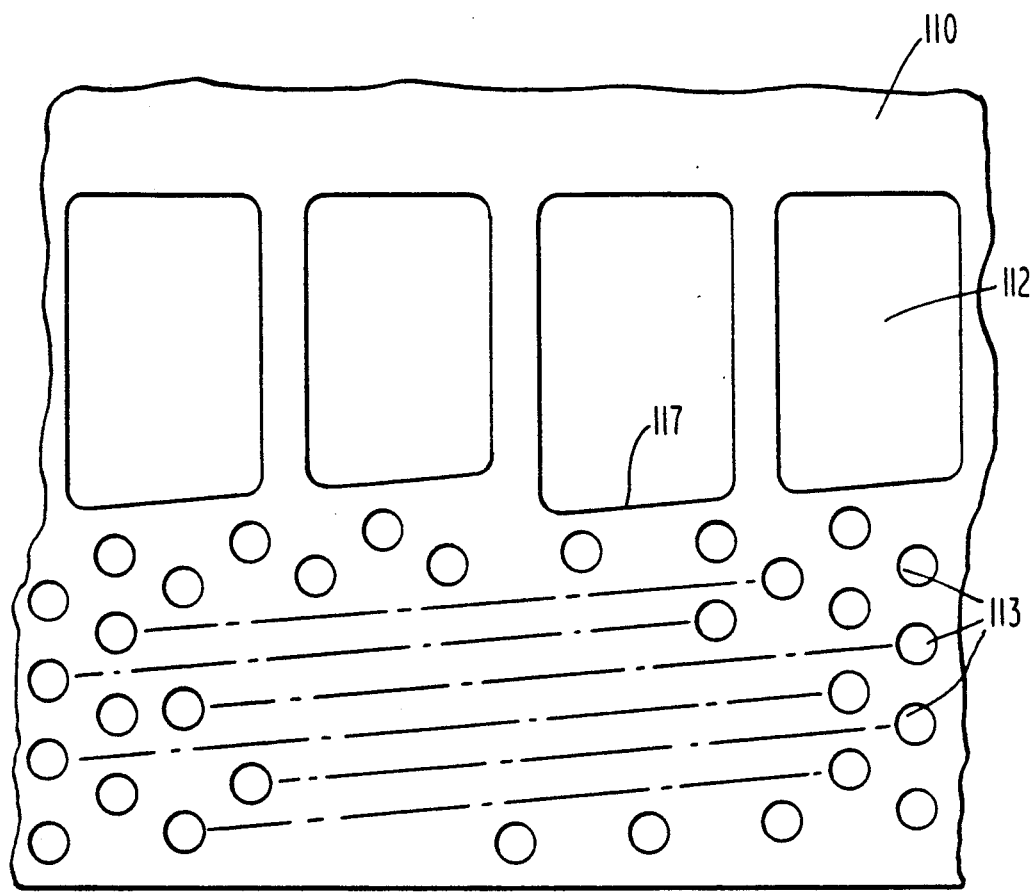

In another aspect of this invention, described in FIG. 4, the muffler apparatus 300 includes window openings 112 which are spaced around the circumference of the cylindrical wall 110 above the helix formation 113. In this embodiment, the cylindrical wall 110 comprises a sloping surface 117 defining a portion of a window opening 112. The sloping surface 117 is preferably disposed substantially parallel to the helix line cf the helix formation 113 for minimizing deadband.

With conventional flow hole or aperture arrays, such as that described in FIG. 2, there exists a "deadband"

when the valve plug is raised just above the last aperture, and before it reaches the window openings 381 in the control valve. This is because the current aperture arrangements do not provide a continuous increase in steam flow with increased vertical valve plug sliding.

Accordingly, with the inclusion of a sloping surface 117 on one or more of the window openings, before the valve plug reaches the top of the uppermost holes in the helix arrangement, portions of the muffler windows are already uncovered, thus deadband is substantially eliminated.

The disclosed mufflers are most appropriately produced by using a multi-spindle drilling machine with two heads 180° apposed. In such a device, the work piece can be rotated and moved axially between successive drilling operations. The machining can be numerically controlled employing an operational sequence defined by the numbers above each vertical column of the holes in FIG. 3. Following is a preferred drilling procedure:

1. Drill the holes along columns 1 and 1' simultaneously. Note these are exactly opposite each other, 180° apart.
2. Index the work piece by 1/n revolution about its axis, and a distance e along its axis. Then drill the holes along columns 2 and 2' simultaneously.
3. Repeat the above steps to drill the holes along columns 3 and 3', and continue on urtil the holes along columns 7 and 7' have been drilled. This last step completes the hole pattern shown in FIG. 3.

For the foregoing, it can be realized that this invention provides improved structural integrity and more fluid flow of steam through the control valve. Although various embodiments have been illustrated, this was for the purpose of describing, but not limiting, the invention. Various modifications, which will become apparent to one skilled in the art, are within the scope of this invention described in the attached claims.

What is claimed:

1. In a steam-driven electric power plant of the type including a steam control valve, the improvement comprising a muffler disposed within said steam control valve having a cylindrical wall, said cylindrical wall having a plurality of substantially circular apertures disposed therethrough, said apertures being spaced substantially equilaterally from one another within a portion of said cylindrical wall and disposed in adjacent loops of a single helix.

2. The power plant of claim 1, wherein the centers of said apertures are disposed in a repetitive pattern of a substantially equilateral triangle whose base is equal to about twice the vertical pitch of said helix.

3. The power plant of claim 2, wherein the number of said apertures of each said adjacent loop is a multiple of 0.5.

4. An improved control valve comprising: a muffler apparatus including a cylindrical wall having a plurality of substantially circular apertures disposed therethrough, said apertures spaced substantially equilaterally from one another within a portion of said cylindrical wall to form a substantially helical pattern and disposed in adjacent loops of a single helix.

5. The valve of claim 4 wherein the centers of said apertures are disposed in a repetitive pattern of a substantially equilateral triangle whose base is equal to about twice the vertical pitch of said helix.

6. The valve of claim 5 wherein the number of said apertures of each of said adjacent loops is a nultiple of 0.5.

7. An improved control valve comprising:
a muffler appartus including a cylindrical wall having a plurality of substantially circular apertures disposed therethrough, said apertures spaced substantially equilaterially from one another within a portion of said cylindrical wall to form a substantially helical pattern; and
further comprising at least one window opening disposed through said cylindrical wall, said window opening having a sloping surface which is substantially parallel to the helix line of said helical pattern, for minimizing deadband.

8. The valvue of claim 7 wherein said substantially circular apertures are disposed in a helix formation about a first end portion of said cylindrical wall.

9. The valve of claim 8 further comprising a plurality of said window openings spaced around the circumference of said cylindrical wall above said helix formation.

10. A control valve for controlling the flow of pressurized steam in a turbine section of a nuclear power plant, said control valve comprising a muffler apparatus including a cylindrical wall having a plurality of substantially circular apertures disposed therethrough, said apertures being disposed to form a substantially helical pattern with a helix line, said cylindrical wall having at least one window opening, said window opeing having a sloping surface substantially parallel to said helix line.

11. The control valve of claim 10 wherein said substantially circular apertures are disposed in adjacent loops of a single helix and wherein the centers of said apertures are disposed in a repetitive pattern of a substantially equilateral triangle whose base is equal to about twice the vertical pitch of said helix.

12. The control valve of claim 10 wherein said apertures are disposed in overlapping loops of a double helix, each of said helixes of said double helix having substantially the same vertical pitch, the centers of said apertures being disposed in a repetitive pattern of a substantially equilateral triangle having a base equal to about the vertical pitch of each helix.

* * * * *